(12) United States Patent
Newendorp et al.

(10) Patent No.: US 10,131,350 B2
(45) Date of Patent: Nov. 20, 2018

(54) SYSTEM AND METHOD OF A VELOCITY CONTROL MECHANISM FOR A VEHICLE

(71) Applicant: Deere & Company, Moline, IL (US)

(72) Inventors: Bruce C. Newendorp, Cedar Falls, IA (US); Julian Baumann, Karlsruhe (DE); Andreas Ahrens, Mannheim (DE); Michael A. Rehberg, Walker, IA (US); Christian Wetzel, Wald-Michaelbach (DE); David J. Easton, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 311 days.

(21) Appl. No.: 14/885,630

(22) Filed: Oct. 16, 2015

(65) Prior Publication Data
US 2017/0106860 A1    Apr. 20, 2017

(51) Int. Cl.
*B60W 30/14* (2006.01)
*B60W 50/08* (2012.01)
*B60W 50/10* (2012.01)

(52) U.S. Cl.
CPC ........ *B60W 30/143* (2013.01); *B60W 50/082* (2013.01); *B60W 50/10* (2013.01); *B60K 2310/20* (2013.01); *B60K 2310/30* (2013.01); *B60W 2720/10* (2013.01); *B60W 2720/106* (2013.01)

(58) Field of Classification Search
CPC combination set(s) only.
See application file for complete search history.

(56) References Cited

U.S. PATENT DOCUMENTS

| 7,721,840 | B2* | 5/2010 | McCord .................... B62D 1/12 |
| | | | 180/321 |
| 8,322,482 | B2* | 12/2012 | Sprinkle .............. A01B 63/118 |
| | | | 180/321 |
| 9,050,890 | B2 | 6/2015 | Buerkle et al. |

(Continued)

FOREIGN PATENT DOCUMENTS

| DE | 2341459 | 3/1974 |
| DE | 19841838 | 3/2000 |

(Continued)

OTHER PUBLICATIONS

DE102016220005.4 Search Report from the German Intellectual Property Office dated Jun. 30, 2017 (11 pages, which includes a Statement of Relevance).

*Primary Examiner* — Redhwan K Mawari
(74) *Attorney, Agent, or Firm* — Michael Best & Friedrich LLP

(57) ABSTRACT

A velocity control mechanism for a vehicle operable to move in a forward direction and a rearward direction. The velocity control mechanism includes an acceleration control mode operable to accelerate the vehicle in one of the forward direction and the rearward direction, a velocity control mode operable to control a velocity of the vehicle in one of the forward and the rearward direction, and an intermediate control mode positioned between the acceleration control mode and the velocity control mode. An actuator is moveable between the acceleration control mode and the velocity control mode and is biased into the intermediate control mode.

20 Claims, 4 Drawing Sheets

(56) References Cited

U.S. PATENT DOCUMENTS

| | | | | |
|---|---|---|---|---|
| 2001/0005073 A1* | 6/2001 | Choi | ................ | A61G 5/045 |
| | | | | 280/647 |
| 2015/0047918 A1* | 2/2015 | Buerkle | ............. | B60K 26/00 |
| | | | | 180/321 |

FOREIGN PATENT DOCUMENTS

| DE | 10324726 | 12/2004 |
|---|---|---|
| DE | 102006028045 | 12/2007 |
| DE | 102010025089 | 2/2011 |

* cited by examiner

SYSTEM AND METHOD OF A VELOCITY CONTROL MECHANISM FOR A VEHICLE

BACKGROUND

The present disclosure relates to a vehicle including a velocity control mechanism.

SUMMARY

In one aspect, the disclosure provides a velocity control mechanism for a vehicle operable to move in a forward direction and a rearward direction. The velocity control mechanism includes an acceleration control mode operable to accelerate the vehicle in one of the forward direction and the rearward direction, a velocity control mode operable to control a velocity of the vehicle in one of the forward and the rearward direction, and an intermediate control mode positioned between the acceleration control mode and the velocity control mode. An actuator is moveable between the acceleration control mode and the velocity control mode and is biased into the intermediate control mode.

In another aspect, the disclosure provides a velocity control mechanism operable to control a vehicle at a maximum forward velocity setting and a maximum rearward velocity setting. The velocity control mechanism includes a processor configured to receive a first signal from an actuator selectively positionable in a velocity control mode in which the vehicle operates at a maximum limited forward velocity less than the maximum forward velocity setting and a maximum limited rearward velocity less than the maximum rearward velocity setting. The first signal represents a desired vehicle forward velocity. The processor is also configured to control a velocity of the vehicle in the forward direction based on the first signal and receive a second signal from the actuator. The second signal represents a desired vehicle rearward velocity. The processor is further configured to control a velocity of the vehicle in the rearward direction based on the second signal.

In yet another aspect, the disclosure provides a velocity control mechanism for a vehicle operable to move in a forward direction and a rearward direction. The velocity control mechanism includes a first forward slot in which an actuator is moveable to control a forward acceleration of the vehicle and a first rearward slot parallel to the first forward slot. The actuator is moveable within the first rearward slot to control a rearward acceleration of the vehicle. The velocity control mechanism also includes a side slot orthogonal to the first forward and rearward slot. The actuator is moveable within the side slot to control the vehicle at a forward determined velocity. The velocity control mechanism further includes a second forward slot parallel to the first forward slot and in communication therewith by a passageway. The actuator is moveable within the second forward slot to control a forward velocity of the vehicle. The velocity control mechanism includes a second rearward slot parallel to the first rearward slot and in communication therewith by the passageway. The actuator is moveable within the second rearward slot to control a rearward velocity of the vehicle.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
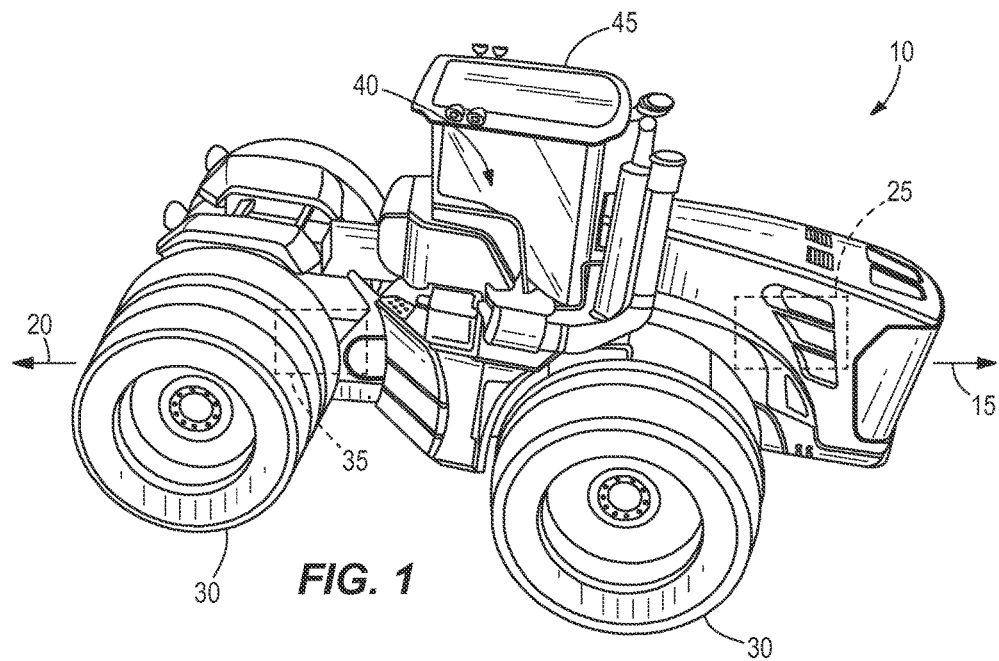
FIG. 1 is a perspective view of a vehicle including a velocity control mechanism according to an embodiment of the disclosure.

FIG. 1 illustrates a vehicle 10 operable to move in a forward direction 15 or a rearward direction 20 by a prime mover 25 driveably coupled to wheels 30. In the illustrated embodiment, the vehicle 10 is an agricultural tractor; however, the vehicle 10 described herein is not limited in its application to agricultural tractors and may be associated with other vehicles. For example, the vehicle 10 may be earth moving vehicles, construction vehicles, snow removal vehicles, sand moving vehicles, forestry harvesting vehicles, cargo moving vehicles, mining vehicles, on highway vehicles, automotive vehicles, etc. In other embodiments, the wheels 30 may be continuous tracks providing traction to the vehicle 10.

The illustrated prime mover 25 may include any power source to provide rotational driveline power to the wheels 30. For example, the prime mover 25 may include, but is not limited to, an internal combustion engine, a piston engine, a rotary engine, a hydraulic motor, a hydrostatic system, an electric motor, etc. In some embodiments, a transmission 35 is driveably coupled between the prime mover 34 and the wheels 30 to provide a mechanical gear reduction therebetween. The illustrated prime mover 25, the wheels 30, and the transmission 35 are operable to move the vehicle 10 at a determined velocity either in the forward direction 15 or the rearward direction 20. In the illustrated embodiment, the maximum forward velocity is about 50 kilometer per hour (km/hr), and the maximum rearward velocity is about 30 km/hr. In other embodiments, the maximum forward velocity is about 40 km/hr and the maximum rearward velocity is about 20 km/hr.

Figure 2:
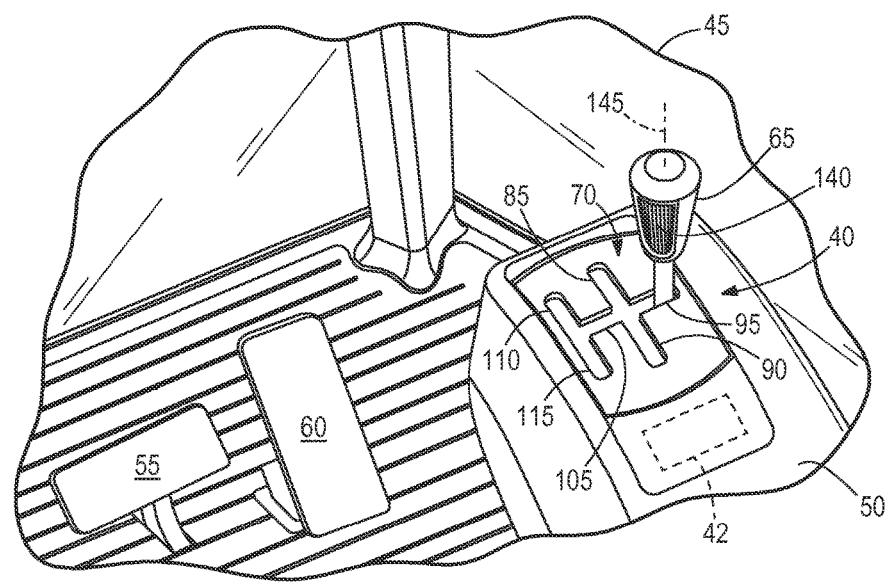
FIG. 2 is a perspective view of the velocity control mechanism located within a cab of the vehicle of FIG. 1.

With reference to FIGS. 1 and 2, a velocity control mechanism 40 is located within a cab 45 of the vehicle 10. The illustrated velocity control mechanism 40 includes a control processor 42 and is operable to control a velocity of the vehicle 10 in the forward direction 15 or the rearward direction 20 as well as to control the vehicle 10 into a stopped or immobile state. In particular, the velocity control mechanism 40 is coupled to a command seat or control console 50 with the seat 50 rotatable such that the seat 50 can face the forward direction 15 or the rearward direction 20. In other embodiments, the velocity control mechanism 40 may be located elsewhere in the cab 45 separate from the command seat 50 such that the velocity control mechanism 40 does not move relative to the command seat 50. In addition, the velocity control mechanism 40 is positioned adjacent other controls (e.g., a hitch control, a selective control valve (SCV), a power take-off (PTO), etc.) located within the cab 45. In the illustrated embodiment, an accelerator pedal 60, which is operable to control acceleration and velocity of the vehicle 10, and a brake pedal 55, which is operable to control deceleration of the vehicle 10, are also located in the cab 45.

Figure 3:
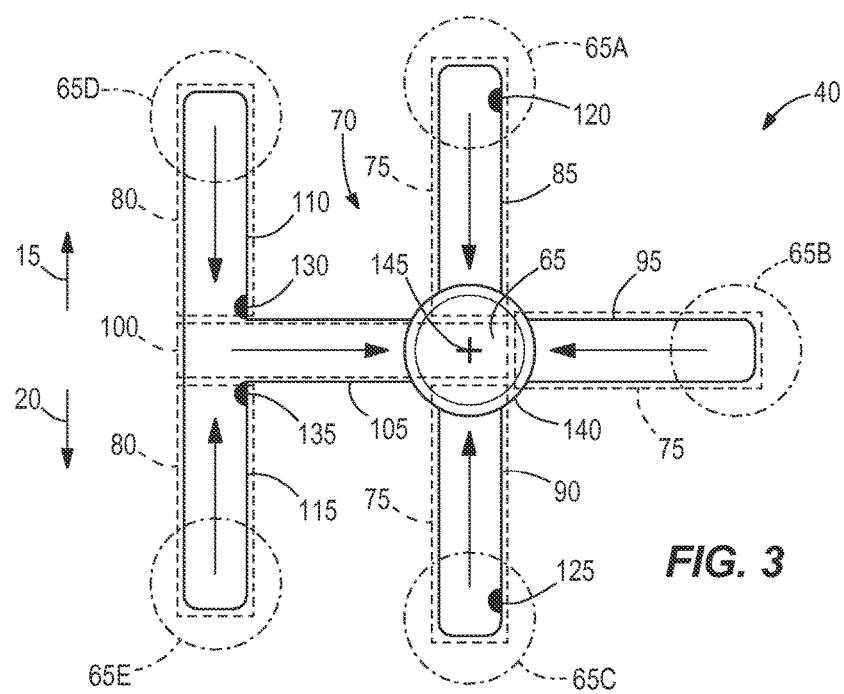
FIG. 3 is a top view of the velocity control mechanism of FIG. 2 including a joystick.

With reference to FIG. 3, the velocity control mechanism 40 includes an actuator 65 (e.g., a lever or joystick) selectively positionable within a pathway 70 in the form of an aperture within a portion of the control console 50 defining an acceleration control mode 75 and a velocity control mode 80. The illustrated acceleration control mode 75 includes a first forward recess, slot, or gate 85, a first rearward gate 90 parallel with the first forward gate 85, and a side gate 95 perpendicular to the gates 85, 90. An intermediate control mode 100 is defined by a passageway 105 and is located between the first forward gate 85, the first rearward gate 90, and the side gate 95 and is also parallel with the side gate 95. In the illustrated embodiment, the joystick 65 is biased into the intermediate control mode 100, at a position illustrated in FIG. 3, by a biasing member (e.g., a spring). An operator can move the joystick 65 out of the position illustrated in FIG. 3 by overcoming a detent mechanism (not shown) surrounding the joystick 65.

The illustrated passageway 105 provides communication between the acceleration control mode 75 (i.e., the first forward gate 85, the first rearward gate 90, and the side gate 95) and a second forward gate 110 and a second rearward gate 115 associated with the velocity control mode 80. As such, the intermediate control mode 100 is located between the acceleration control mode 75 and the velocity control mode 80. In the illustrated embodiment, the second forward gate 110 is parallel to the first forward gate 85 with the first forward gate 85 extending further from the passageway 105 than the second forward gate 110, and the second rearward gate 115 is parallel to the first rearward gate 90 with the first rearward gate 90 extending further from the passageway 105 than the second rearward gate 115.

A primary forward detent mechanism 120 is positioned near an end of the first forward gate 85 away from the intermediate control mode 100, and a primary rearward detent mechanism 125 is positioned near an end of the first rearward gate 90 away from the intermediate control mode 100. In the illustrated embodiment, the detent mechanisms 120, 125 are non-latching detents that provide positive feedback when the joystick 65 engages the detent mechanisms 120, 125. In addition, a limited forward detent mechanism 130 is positioned at or near an end of the second forward gate 110 adjacent the passageway 105, and a limited rearward detent mechanism 135 is positioned at or near an end of the second rearward gate 115 adjacent the passageway 105. The detent mechanisms 130, 135 are similar to the detent mechanisms 120, 125 in that the detent mechanisms 130, 135 provide positive feedback when the joystick 65 engages the detent mechanisms 130, 135.

With reference to FIGS. 2 and 3, an adjustment mechanism 140 is partially enclosed within the joystick 65 such that two portions (one of which is shown in FIG. 2) opposite from each other are configured to be gripped by the operator. In the illustrated embodiment, the adjustment mechanism is an encoder wheel rotatable about an axis 145. In other embodiments, the adjustment mechanism 140 may be located on a top surface of the joystick 65. In further embodiments, the adjustment mechanism 140 may be linearly translatable relative to the joystick 65.

In operation, the operator of the vehicle can manipulate the joystick 65 within the acceleration control mode 75 to control acceleration, and ultimately a velocity, of the vehicle 10 in the forward direction 15 or the rearward direction 20. In particular, a position of the joystick 65 within the acceleration control mode 75 is conveyed to the processor 42 to control acceleration of the vehicle 10. By moving the joystick 65 into the first forward gate 85 towards the detent mechanism 120, the vehicle 10 accelerates in the forward direction 15 at a set acceleration rate programmed within the processor 42. Thus, any position of the joystick 65 within the first forward gate 85 will accelerate the vehicle 10 at the set acceleration rate. In the illustrated embodiment, the processor 42 is programmed with three different forward acceleration rates to which the operator can select between. For example, a switch may be located on the joystick 65 or the control console 50 to select between the three different acceleration rates. In other embodiments, the processor 42 may be programmed with more or fewer than three acceleration rates. If the operator releases the joystick 65 within the first forward gate 85, the joystick 65 biases back into the intermediate control mode 100 at the position illustrated in FIG. 3, and the vehicle will remain at a velocity reached during acceleration prior to releasing the joystick 65.

A maximum forward velocity of the vehicle 10 is selected when the joystick 65 engages the detent mechanism 120, illustrated as joystick 65A in FIG. 3. In one embodiment, the maximum forward velocity is selectively programmed into the processor 42 such that the operator can select one of a plurality of maximum velocities. In other embodiments, the maximum forward velocity may be the absolute maximum velocity of the vehicle 10, or the maximum forward velocity may be a determined maximum forward velocity suitable for a specific terrain (e.g., hilly, bumpy, incline, etc.). In the illustrated embodiment, the detent mechanism 120 conveys manual feedback to the operator when the joystick 65A reaches the maximum forward velocity. If the operator releases the joystick 65A after engaging the detent mechanism 120, the joystick 65A biases back into the intermediate control mode 100 at the position illustrated in FIG. 3, but the vehicle 10 will continue to accelerate at the set acceleration rate until the maximum forward velocity is reached. At any time during operation, the operator can actuate the brake pedal 55 to override the velocity control mechanism 40, which decelerates the vehicle 10 into the immobile state. However, the vehicle 10 will again accelerate once the brake pedal 55 is released and the joystick 65 positioned within the first forward gate 85.

The side gate 95 is operable to maintain a forward set point velocity of the vehicle 10. Stated another way, when the joystick 65 is moved into the side gate 95, illustrated as joystick 65B in FIG. 3, the vehicle 10 will accelerate or decelerate to and hold at a predetermined velocity, similarly to an automotive cruise control mechanism. The forward set point velocity is adjustable by the operator. In the illustrated embodiment, the joystick 65B is biased back into the intermediate control mode 100 at the position illustrated in FIG. 3 once released, but the vehicle 10 is maintained at the forward set point velocity. In other embodiments, the joystick 65B is not biased into the intermediate control mode 100 once the operator releases the joystick 65B within the side gate 95. Rather, the joystick 65B is maintained in the side gate 95 until the operator moves the joystick 65B back into the intermediate control mode 100.

By moving the joystick 65 into the first rearward gate 90 towards the detent mechanism 125, the vehicle 10 accelerates in the rearward direction 20 at a set acceleration rate selected by the operator, similar to moving the joystick 65 into the first forward gate 85 as discussed above. In the illustrated embodiment, the processor 42 is programmed with three different rearward acceleration rates between which the operator can select. If the operator releases the joystick 65 within the first rearward gate 90, the joystick 65 biases back into the intermediate control mode 100 in the position illustrated in FIG. 3 and the vehicle will remain at a velocity reached during acceleration prior to releasing the joystick 65. In other embodiments, the processor 42 may be programmed with more or fewer than three acceleration rates. At any time during operation, the operator can actuate the brake pedal 55 to override the velocity control mechanism 40. However, the vehicle 10 will again accelerate once the brake pedal 55 is released and the joystick 65 positioned within the first rearward gate 90.

In addition, the operator can stop the vehicle by manipulating the joystick 65 within the acceleration control mode 75. For example, by moving the joystick 65 into the first forward 85 and releasing the joystick 65 to be biased into the position illustrated in FIG. 3, the vehicle 10 will travel at a set velocity in the forward direction 15, as described above. If the operator then moves the joystick 65 to engage the detent 125, illustrated as joystick 65C in FIG. 3, and again releases the joystick 65C to be biased back into the position illustrated in FIG. 3, the vehicle 10 will decelerate to a stop. A similar operation is performed if the vehicle 10 is accelerating in the rearward direction 20 and the operator moves the joystick 65 into engagement with the detent 120.

It is advantageous to directly control a velocity of the vehicle 10 (rather than controlling an acceleration of the vehicle 10 to reach a desired velocity) to increase accuracy and manipulation while the vehicle 10 is moving. For example, the vehicle 10 may be selectively attached to an auxiliary implement, which may include a trailer attached to a hitch of the vehicle 10, a hydraulic loader bucket attached to a front portion of the vehicle 10, etc. While moving the vehicle 10 into alignment with the auxiliary implement to be attached thereto, the operator decreases the velocity of the vehicle 10 while approaching the auxiliary implement.

The velocity control mode 80 provides direct velocity control to the vehicle 10 compared to controlling an acceleration of the vehicle 10 via the acceleration control mode 75. By moving the joystick 65 along the passageway 105 of the intermediate control mode 100 away from the side gate 95, the joystick 65 is positioned to enter into the second forward gate 110 or the second rearward gate 115. To enter the second forward gate 110, the joystick 65 engages and moves past the detent mechanism 130 providing the operator positive feedback such that the operator does not inadvertently enter the second forward gate 110.

Figure 4:
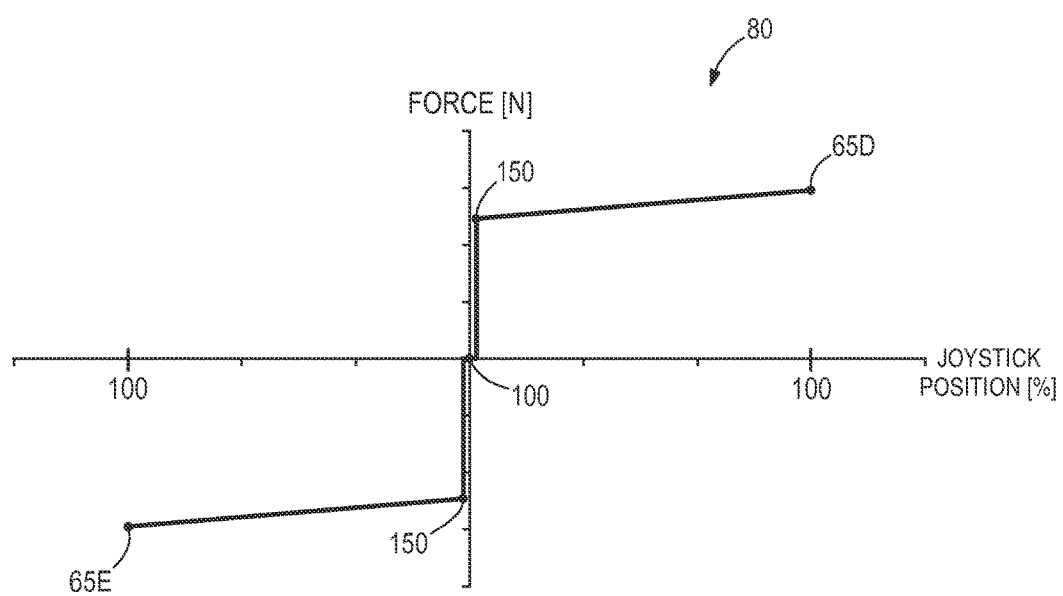
FIG. 4 illustrates a graph of a relative position of the joystick of FIG. 3 in response to a force acting on the joystick.

With reference to FIG. 4, a user must apply a threshold force 150 to the joystick 65 to enter the second forward gate 110 or the second rearward gate 115. In the illustrated embodiment, the threshold force 150 is substantially the force associated with moving the joystick 65 past the detent mechanisms 130, 135. A position of the joystick 65 within the second forward gate 110 or the second rearward gate 115 is illustrated by a percent of position away from the intermediate control mode 100. In the illustrated embodiment, the threshold force 150 is about 2.5 Newtons (N) or about 0.5 pounds-force (lbf); however, in other embodiments, the threshold force 150 may be greater than or less than 0.5 lbf. Once the threshold force 150 is exceeded, the force to move the joystick 65 linearly increases. In other embodiments, the force required to move the joystick 65 after the threshold force 150 is exceeded may increase in a different matter (e.g., quadratically).

Figure 5:
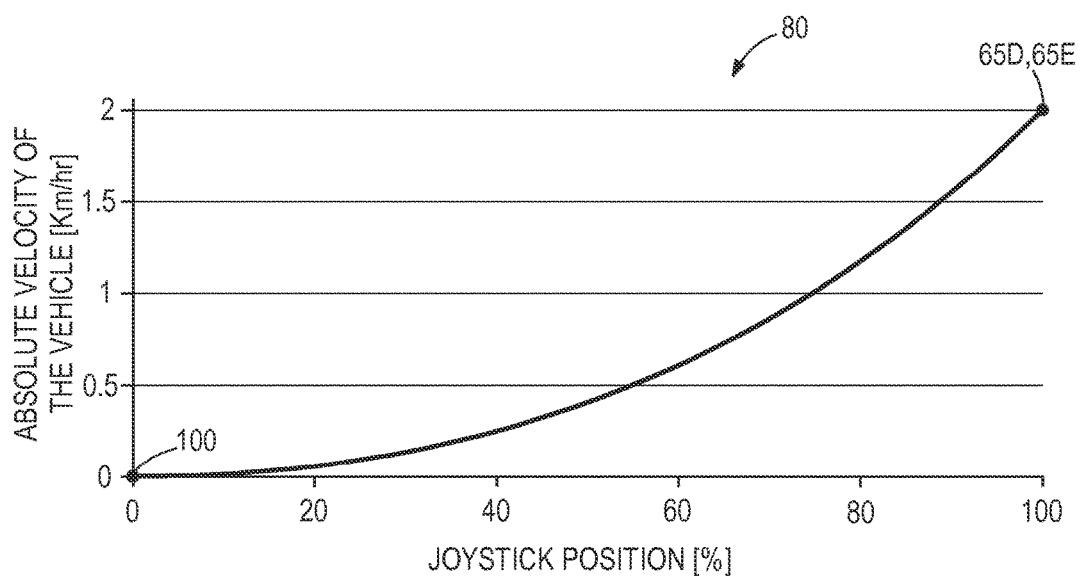
FIG. 5 illustrates a graph of a relative position of the joystick of FIG. 3 and a velocity of the vehicle.
Figure 6:
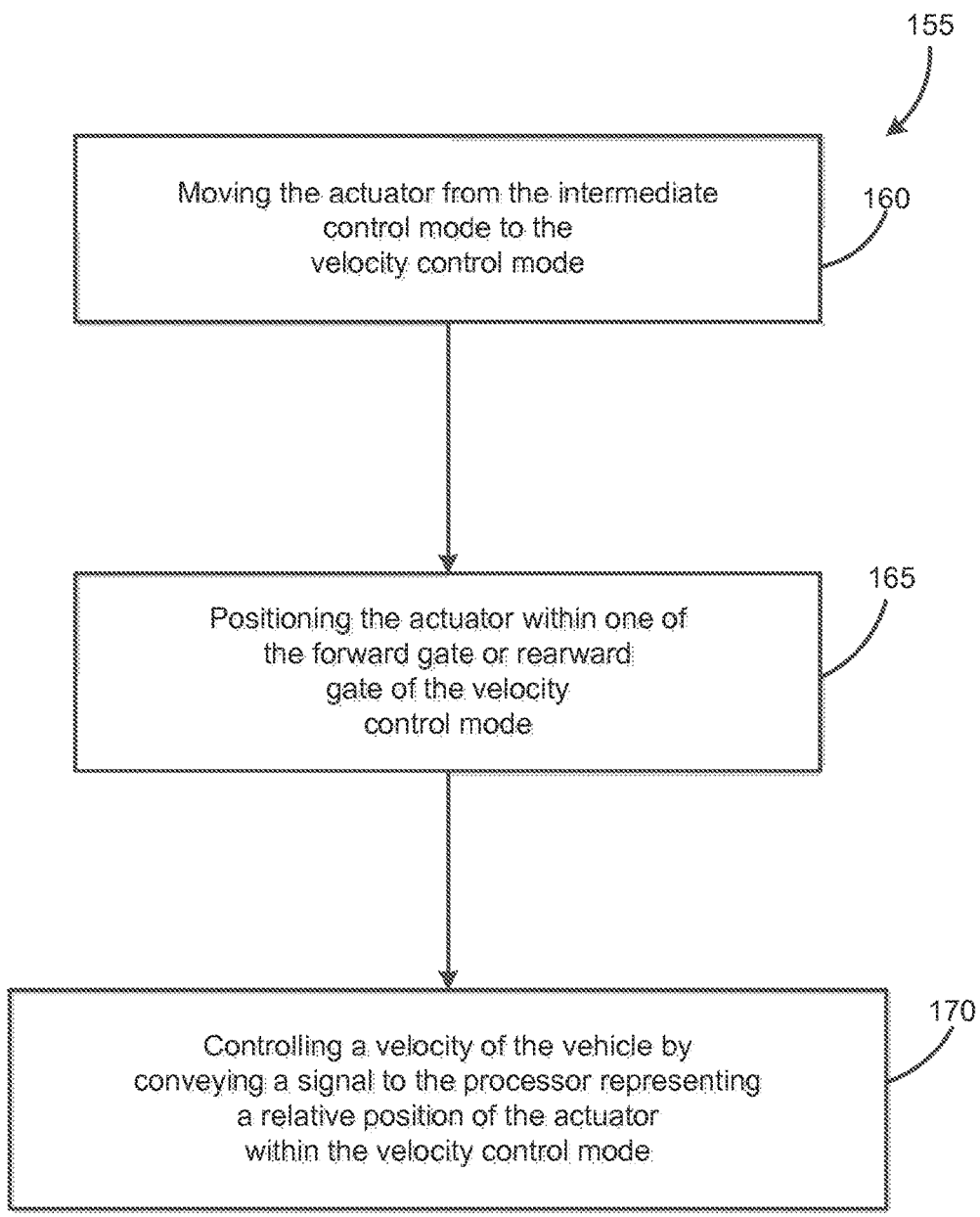
FIG. 6 illustrates a method of operation of the velocity control mechanism.

With reference to FIGS. 5 and 6, a method 155 of controlling a velocity of the vehicle 10 via the velocity control mechanism 40 is illustrated. Moving the joystick 65 from the intermediate control mode 100 to the velocity control mode 80 (step 160) will align the joystick 65 with the second forward gate 110 and the second rearward gate 115. By moving the joystick 65 into the second forward gate 110 (step 165) and overcoming the threshold force 150, the vehicle 10 moves in the forward direction 15 at a velocity proportional to a position of the joystick 65 within the second forward gate 110. In particular, the velocity control mechanism 40 controls a velocity of the vehicle 10 by conveying a signal to the processor 42 representing a relative position of the joystick 65 within the velocity control mode 80 (step 170). In the illustrated embodiment, an absolute velocity of the vehicle 10 when the joystick 65 is within the velocity control mode 80 spans from the immobile state of the vehicle 10 to a maximum limited velocity setting of about 2 km/hr. The maximum limited velocity setting is less than the maximum velocity of the vehicle 10. In the illustrated embodiment, the maximum limited velocity setting is determined within the processor 42. In other embodiments, the maximum limited velocity setting may be less than 5 km/hr. The maximum limited velocity setting is reached when the joystick 65 is positioned at an end of the second forward gate 110 away from the detent mechanism 130, illustrated as joystick 65D in FIG. 3. The illustrated relationship between a velocity of the vehicle 10 and a relative position of the joystick 65 within the second forward gate 110 is non-linear (e.g., a quadratic relationship) to increase resolution at lower velocities. In other embodiments, the relationship between a velocity of the vehicle 10 and a relative position of the joystick 65 within the second forward gate 110 may be different (e.g., a linear relationship).

The adjustment mechanism 140 is operable to increase or decrease (e.g., expand or contract) a range of velocities as illustrated in FIG. 5. For example, by rotating the adjustment mechanism 140 in a first direction, a signal is conveyed to the processor 42 and the maximum limited velocity setting (e.g., 2 km/hr) increases, and if the adjustment mechanism 140 is rotated in a second direction opposite from the first direction, a signal is conveyed to the processor 42 and the maximum limited velocity setting decreases. In the illustrated embodiment, the adjustment mechanism 140 can increase the maximum limited velocity setting to about 5 km/hr. However, once the joystick 65 is released and biased into the intermediate control mode 100 at the position illustrated in FIG. 3, the maximum limited velocity setting defaults back to the original maximum limited velocity setting (e.g., 2 km/hr).

If the operator releases the joystick 65 after entering the second forward gate 110, the joystick 65 biases back into the intermediate control mode 100 thereby stopping the vehicle 10. Alternatively, the operator can actuate the brake pedal 55 to override the velocity control mechanism 40. However, the vehicle 10 will return to a velocity proportional to the position of the joystick 65 within the second forward gate 110 once the brake pedal 55 is released.

By moving the joystick 65 into the second rearward gate 115, the vehicle 10 moves in the rearward direction 20 at a velocity proportional to a position of the joystick 65 within the second rearward gate 110, as illustrated within FIG. 5. In particular, a signal is conveyed to the processor 42 to control a velocity—in the rearward direction 20—of the vehicle 10. The maximum limited velocity setting is reached when the joystick 65 is positioned at an end of the second rearward gate 115 away from the detent mechanism 135, as illustrated as joystick 65E in FIG. 3. If the operator releases the joystick 65 after entering the second rearward gate 115, the joystick 65 biases back into the intermediate control mode 100 thereby stopping the vehicle 10. Alternatively, the operator can actuate the brake pedal 55 to override the velocity control mechanism 40. However, the vehicle 10 will return to a velocity proportional to the position of the joystick 65 within the second rearward gate 115 once the brake pedal 55 is released.

The operator can also change direction (e.g., either in the forward direction 15 or the rearward direction 20) of the vehicle 10 by moving the joystick 65 from the acceleration control mode 75 to the velocity control mode 80. In particular, the operator moves the joystick 65 from the first forward gate 85 to the second rearward gate 115 and maintains the joystick 65 within the second rearward gate 115. As such, the vehicle 10 will stop from moving and accelerating in the forward direction 15 and will then move in the rearward direction 20 at a velocity associated with a position of the joystick 65 within the second rearward gate 115. However, if the operator releases the joystick 65 from the second rearward gate 115 into the intermediate control mode 100 before the vehicle 10 comes to a stop, the vehicle 10 will accelerate in the rearward direction 20 until the same velocity is reached before entering the second rearward gate 115. A similar operation will occur if the operator moves the joystick 65 from the first rearward gate 90 into the second forward gate 110 to change direction from the rearward direction 20 to the forward direction 15.

The invention claimed is:

1. A velocity control mechanism for a vehicle operable to move in a forward direction and a rearward direction, the velocity control mechanism comprising:
   an acceleration control mode operable to accelerate the vehicle in one of the forward direction and the rearward direction;
   a velocity control mode operable to control a velocity of the vehicle in one of the forward direction and the rearward direction; and
   an intermediate control mode positioned between the acceleration control mode and the velocity control mode;
   wherein an actuator is moveable between the acceleration control mode and the velocity control mode and biased into the intermediate control mode; and
   wherein the vehicle is configured to move in response to the actuator being positioned either within the acceleration control mode or within the velocity control mode.

2. The velocity control mechanism of claim 1, wherein when the actuator is released from the velocity control mode to be biased into the intermediate control mode, the vehicle is not configured to be controlled by the velocity control mode or the acceleration control mode to move in the forward or rearward direction.

3. The velocity control mechanism of claim 1, wherein the velocity control mode includes a maximum velocity setting less than or equal to an absolute velocity of the vehicle.

4. The velocity control mechanism of claim 3, wherein the maximum velocity setting is less than about 5 kilometers per hour.

5. The velocity control mechanism of claim 3, wherein the actuator includes an adjustment mechanism, and wherein the adjustment mechanism is operable to increase or decrease the maximum velocity setting of the velocity control mode.

6. The velocity control mechanism of claim 5, wherein the adjustment mechanism is a rotatably adjustable adjustment mechanism.

7. The velocity control mechanism of claim 1, wherein the actuator engages a detent to enter the velocity control mode.

8. The velocity control mechanism of claim 7, wherein the actuator enters the velocity control mode when a threshold force acting on the actuator is exceeded, and wherein the threshold force is generally provided by engagement between the detent and the actuator.

9. The velocity control mechanism of claim 1, wherein the relationship between the velocity of the vehicle and the position of the actuator in the velocity control mode is non-linear.

10. The velocity control mechanism of claim 1, wherein the velocity control mode includes a forward gate that receives the actuator to move the vehicle in the forward direction and a rearward gate that receives the actuator to move the vehicle in the rearward direction, and wherein the intermediate control mode is positioned between the forward gate and the rearward gate.

11. The velocity control mechanism of claim 1, wherein the vehicle is configured to move in response to the actuator being positioned within the acceleration control mode and in response to the actuator being positioned within the velocity control mode.

12. The velocity control mechanism of claim 1, wherein the vehicle is configured to be driven from a stationary position without actuating an accelerator pedal of the vehicle in response to the actuator being positioned within the acceleration control mode and in response to the actuator being positioned within the velocity control mode.

13. The velocity control mechanism of claim 1, wherein the velocity control mode is operable to control the velocity of the vehicle in the forward direction and in the rearward direction.

14. The velocity control mechanism of claim 1, further comprising an accelerator pedal configured to control acceleration and velocity of the vehicle.

15. The velocity control mechanism of claim 1, wherein the acceleration control mode is operable to accelerate the vehicle at a predetermined acceleration in response to the actuator being positioned within the acceleration control mode.

16. The velocity control mechanism of claim 15, wherein the acceleration control mode is operable to accelerate the vehicle at one of a plurality of predetermined accelerations.

17. The velocity control mechanism of claim 1, wherein the actuator is configured to control the velocity of the vehicle proportional to a position of the actuator within the velocity control mode.

18. The velocity control mechanism of claim 17, wherein the vehicle is configured to stop in response to the actuator being released from within the velocity control mode and biased into the intermediate control mode.

19. A velocity control mechanism for a vehicle operable to move in a forward direction and a rearward direction, the velocity control mechanism comprising:
   an acceleration control mode operable to accelerate the vehicle in the forward direction and in the rearward direction;
   a velocity control mode operable to control a velocity of the vehicle in the forward direction and in the rearward direction; and
   an intermediate control mode positioned between the acceleration control mode and the velocity control mode;

wherein an actuator is moveable between the acceleration control mode and the velocity control mode and biased into the intermediate control mode.

20. The velocity control mechanism of claim 19, wherein the actuator is configured to control the velocity of the vehicle proportional to a position of the actuator within the velocity control mode.

\* \* \* \* \*